(12) United States Patent
Noerpel et al.

(10) Patent No.: US 6,980,800 B2
(45) Date of Patent: Dec. 27, 2005

(54) SYSTEM AND METHOD FOR PROVIDING CONTENTION CHANNEL ORGANIZATION FOR BROADBAND SATELLITE ACCESS IN A COMMUNICATIONS NETWORK

(75) Inventors: Anthony Noerpel, Lovettsville, MD (US); Channasandra Ravishankar, Germantown, MD (US); Xiaoping He, Frederick, MD (US); Abheek Saha, New Delhi (IN)

(73) Assignee: Hughes Network Systems, El Segundo, CA (US)

( * ) Notice: Subject to any disclaimer, the term of this patent is extended or adjusted under 35 U.S.C. 154(b) by 615 days.

(21) Appl. No.: 10/074,759

(22) Filed: Feb. 12, 2002

(65) Prior Publication Data

US 2003/0153320 A1 Aug. 14, 2003

(51) Int. Cl.[7] .......................... H04Q 7/20; H04B 7/212

(52) U.S. Cl. .................. 455/434; 455/450; 455/452.1; 455/452.2; 370/330; 370/348; 370/461; 370/462; 370/345; 370/337

(58) Field of Search .............................. 370/282, 462, 370/461, 447, 503, 516, 517, 519, 436, 321, 370/324, 350, 278, 316, 337, 338, 502, 329, 370/347, 348, 345, 330; 455/450, 455, 452.1, 455/452.2, 509, 434, 427, 12.1, 502, 504, 455/506

(56) References Cited

U.S. PATENT DOCUMENTS

| | | | | |
|---|---|---|---|---|
| 5,355,374 A | * | 10/1994 | Hester et al. ............... | 370/461 |
| 5,825,811 A | * | 10/1998 | Souissi ........................ | 375/133 |
| 6,249,515 B1 | * | 6/2001 | Kim et al. ................... | 370/337 |
| 6,628,945 B1 | * | 9/2003 | Koorapaty et al. .......... | 455/434 |
| 6,674,730 B1 | * | 1/2004 | Moerder ...................... | 370/316 |
| 6,795,420 B1 | * | 9/2004 | Moulsley et al. ........... | 370/338 |
| 2003/0174668 A1 | * | 9/2003 | Gessner et al. ............. | 370/328 |

\* cited by examiner

*Primary Examiner*—Temica Beamer
*Assistant Examiner*—Julio Perez
(74) *Attorney, Agent, or Firm*—Craig Plastrik

(57) ABSTRACT

Two types of contention channels are used to accommodate broadband packet data in a satellite communication network. A first contention channel is used by unsynchronized user terminals to access the system and request a traffic channel. The first contention channel is of a sufficient duration to accommodate a RACH message, as well as the timing uncertainty between user terminals within a given spot beam. A second contention channel is shorter in duration than the first contention channel, and is narrowband, so that more than one second contention channel may be transmitted within the bandwidth of the broadband traffic channels. The second contention channels are used by synchronized user terminals for transmitting packet RACH, or PRACH, messages. The more efficient nature of the PRACH channels accommodates the increased overhead associated with bursty packet data, without the capacity cost of the longer duration RACH channel.

5 Claims, 5 Drawing Sheets

SYSTEM AND METHOD FOR PROVIDING CONTENTION CHANNEL ORGANIZATION FOR BROADBAND SATELLITE ACCESS IN A COMMUNICATIONS NETWORK

FIELD OF THE INVENTION

The invention is related to a system and method for providing control channel organization in a wireless radio system. More particularly, the invention is related to a system and method for optimizing the control channel organization in a radio communication system, such as a satellite communication system, to support Aloha type contention channel access to a radio communication system by user terminals to satisfy critical timing requirements associated with a long delay environment and to simultaneously minimize the impact on total system overhead.

BACKGROUND OF THE INVENTION

Mobile cellular communication systems have become increasingly important, providing mobile users the security of being able to communicate quickly and reliably from almost any location. Present cellular communication systems use terrestrial transmitters, such as base stations, fixed sites or towers, to define each cell of the system, so that the extent of a particular cellular communication system is limited by the region over which the base stations are distributed. Many parts of the world are relatively inaccessible, or, as in the case of the ocean, do not lend themselves to location of a plurality of dispersed cellular sites. In these regions of the world, spacecraft-based communication systems may be preferable to terrestrial-based systems. It is desirable that a spacecraft cellular communications system adhere, insofar as possible, to the standards which are common to terrestrial systems, and in particular to such systems as the Global System for Mobile Communications (GSM), which is in use in Europe.

A cellular communication system should provide a channel for allowing a user terminal to initiate communications with the network. Each base station, fixed site, or tower continually transmits network synchronization information (SCH) and network-specific information (BCCH), which a user terminal uses to synchronize to the appropriate network at initial turn-on of the user terminal. The GSM system provides a control channel denominated "Random Access Channel" or RACH. In GSM, the RACH channel is used for initial synchronization of the network to the user terminal. To implement the RACH, the user terminal sends to the based station an "access burst," which includes a finite duration modulated carrier, transmitted in one TDMA time slot, carrying information. In the GSM terrestrial system, the burst includes eight beginning tail bits, forty-one synchronization bits, thirty-six coded data bits, and three ending tail bits. In GSM, the slot duration is 156.25 bits long, so the access burst has 68.25 bits of guard time. The thirty-six coded data bits allow coding, using R=½, K=5 convolutional code, of a group of eight bits of information, six bits of cyclic redundancy code (CRC) for error detection, and four bits of decoder trellis termination.

Aloha type contention channel access is the preferred method of terminal access in cellular mobile systems today. This is due to reasons of simplicity, among others. In a slotted aloha system, a terminal's transmitter and receiver must be synchronized to a network timing reference. Because cellular systems are typically characterized by small cell sizes on the order of a mile radius, the timing uncertainty between a terminal and the network timing reference is limited to a few milliseconds.

Satellite communication systems, however, introduce additional factors which must be taken into account in order for the system to function properly. In a satellite communication system, the timing uncertainty of each terminal is greatly increased due to large variations in the total path delay. As shown in FIG. 1, in a geostationary satellite system the total path delay from a user terminal to the satellite varies from approximately 117 msec for terminals immediately below the satellite to approximately 135 msec at the edge of coverage. Thus, the total round trip variation, or uncertainty, in path delay is on the order of 36 msec. In other words, in a geostationary satellite system, the potential error between a terminal's transmit timing reference and the system timing can be as bad as 36 msec without closed loop correction.

Using spot beams to reduce the geographic distance between terminals transmitting on a known beam can reduce the timing uncertainty to a few milliseconds. However, the remaining timing uncertainty is still significantly greater than the uncertainty present in typical land-based systems, and satellite communication systems must account for the increased timing uncertainty.

One method used to account for the increased timing uncertainty in satellite communication systems is to increase the time window in which Random Access Channel (RACH) bursts can be received from earth based terminals at the satellite. Such a method is used in the Thuraya satellite system, which is based on the GMR-1 air interface standard, described in European Telecommunications Standard Institute Document No. TS-101 376.

FIG. 2 illustrates the frequency-time mapping of a typical frame in a GSM radio network. A 200 kHz channel is time divided into 4.62 millisecond frames. Each frame is further divided into eight (8) time slots. One time slot is reserved as a control channel to receive RACH bursts from terminals. The remaining seven (7) time slots are used as traffic channels. Thus, in the GSM system, control channel overhead accounts for 12.5% of the capacity of each 200 kHz channel. Unfortunately, the duration of the control channel in the GSM system is insufficient to account for the timing uncertainties discussed above for satellite based communication networks.

The AceS satellite system, shown in FIG. 3, operates under the GMR-2 air interface standard, described in ETSI document No. TS-101 377. The return link in the AceS system divides a 200 kHz channel into four 50 kHz subchannels. One of the subchannels is reserved for contention channel time slots. The number of time slots can be defined in a given system to have any number of time slots out of the eight time slot frame. Thus, in the AceS system, typically a four time slot contention channel is reserved in the sub channel reserved for contention access, resulting in a 2.31 msec, 50 kHz contention channel. Unfortunately, the subchannels in the AceS system are of insufficient bandwidth for a broadband data system. Furthermore, even if all eight time slots for a given sub channel were reserved as a contention channel, the 4.62 msec frame duration is still insufficient to account for the timing uncertainty among terminals spread out over the earth, which can be on the order of 6 msec, even among terminals within a certain spot beam.

The Thuraya satellite system solved the timing uncertainty problem by incorporating a large contention channel window with sufficient guard time and a contention channel burst design with sufficient synchronization pattern overhead. This solution was adequate for a circuit switched, narrow band system.

Unfortunately, this solution is insufficient for a broadband packet switched system for two reasons. First, in a broadband system, the channels are designed to have broader bandwidth to accommodate broadband traffic. Thus, the additional guard time needed to accommodate for the increased timing uncertainties associated with satellite based systems is much more "expensive" due to the broader bandwidth associated with the additional guard time. Secondly, packet switched traffic is bursty by nature, as compared to circuit switched systems. Thus, the volume of connections are dramatically increased, causing a corresponding increase in demand on the contention channel.

Accordingly, there is a need for a contention channel design in a satellite based broadband packet switched communication system which effectively compensates for the increased timing uncertainty of satellite transmissions, while avoiding unnecessary waste of bandwidth, and accommodating the increased contention channel demand of a packet switched system.

SUMMARY OF THE INVENTION

The above described disadvantages are overcome, and other advantages are realized by a system for transmitting access request messages (RACH's) over two types of contention channels. The first contention channel has a duration at least equal to the duration of a RACH message plus the maximum timing uncertainty between user terminals in a given spot beam. The first contention channel is used by unsynchronized user terminals to request traffic channel access, as well as for coarse timing correction. The second contention channel type is used by synchronized terminals to transmit "packet RACH" (PRACH) messages. The second contention channel type is shorted in duration, and preferably is a narrowband signal, so that more than one PRACH channel can be configured within the bandwidth of a broadband traffic channel.

The invention also provides a method of transmitting access request signals in a wireless network. The method comprises receiving a beacon signal from the network, transmitting a RACH message within a first contention channel, said channel having a duration equal to the length of said RACH message plus the maximum timing uncertainty of an unsynchronized user terminal, receiving timing correction information from said network, and based on said timing correction information, transmitting a PRACH message within a second contention channel, the second contention channel having a duration which is shorter than the first contention channel.

BRIEF DESCRIPTION OF THE DRAWINGS

The invention will be more readily understood with reference to the following figures, in which.

In the figures, it will be understood that like numerals refer to like features and structures.

DETAILED DESCRIPTION OF THE INVENTION

The following description of the presently contemplated best mode of practicing the invention is not to be taken in a limiting sense, but is made merely for the purpose of describing the general principles of the invention. The scope of the invention should be determined with reference to the claims.

Figure 1:
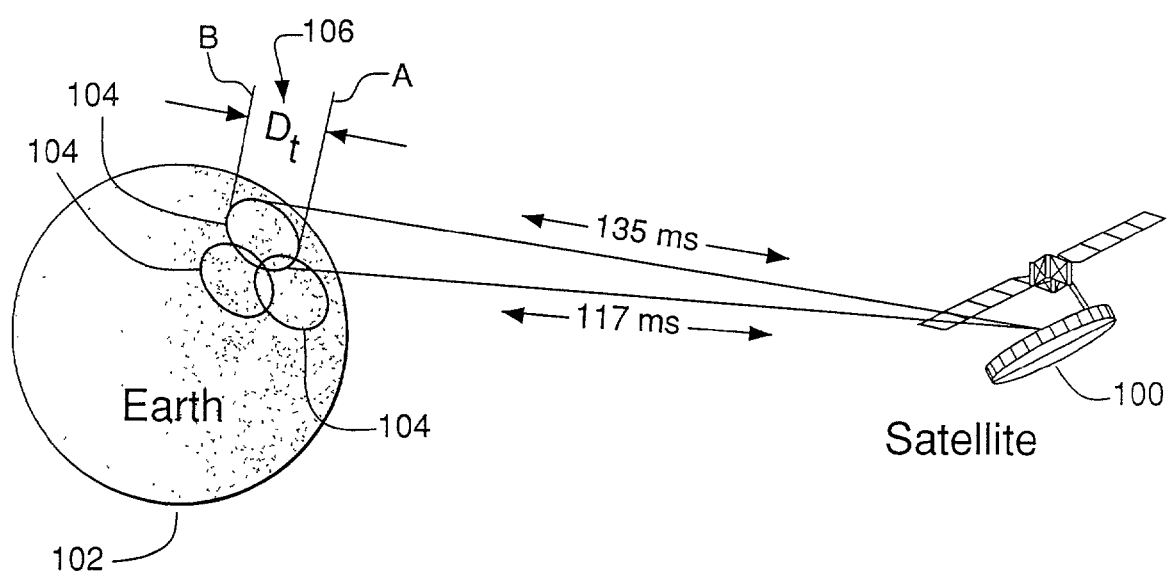
FIG. 1 illustrates path differences among terminals in a satellite system.
Figure 2:
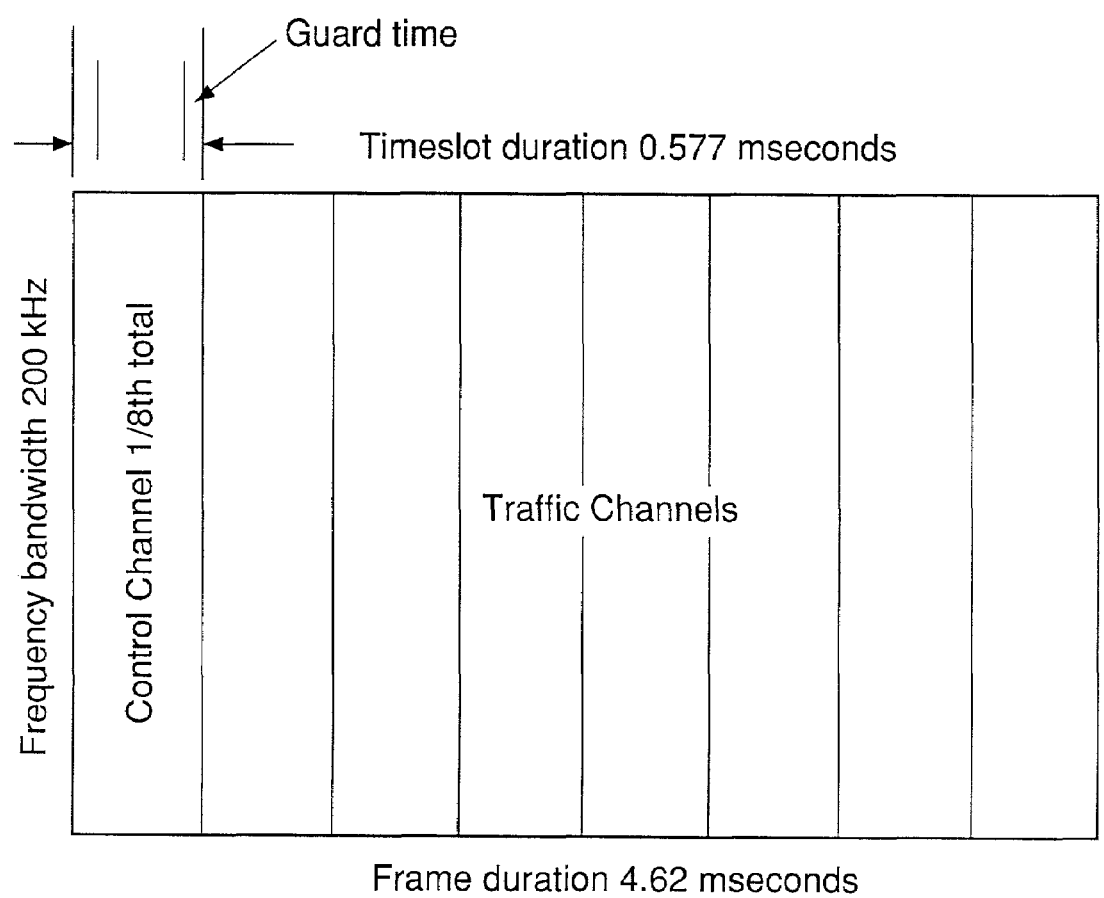
FIG. 2 illustrates the frequency-time organization plan of a GSM communication system.
Figure 3:
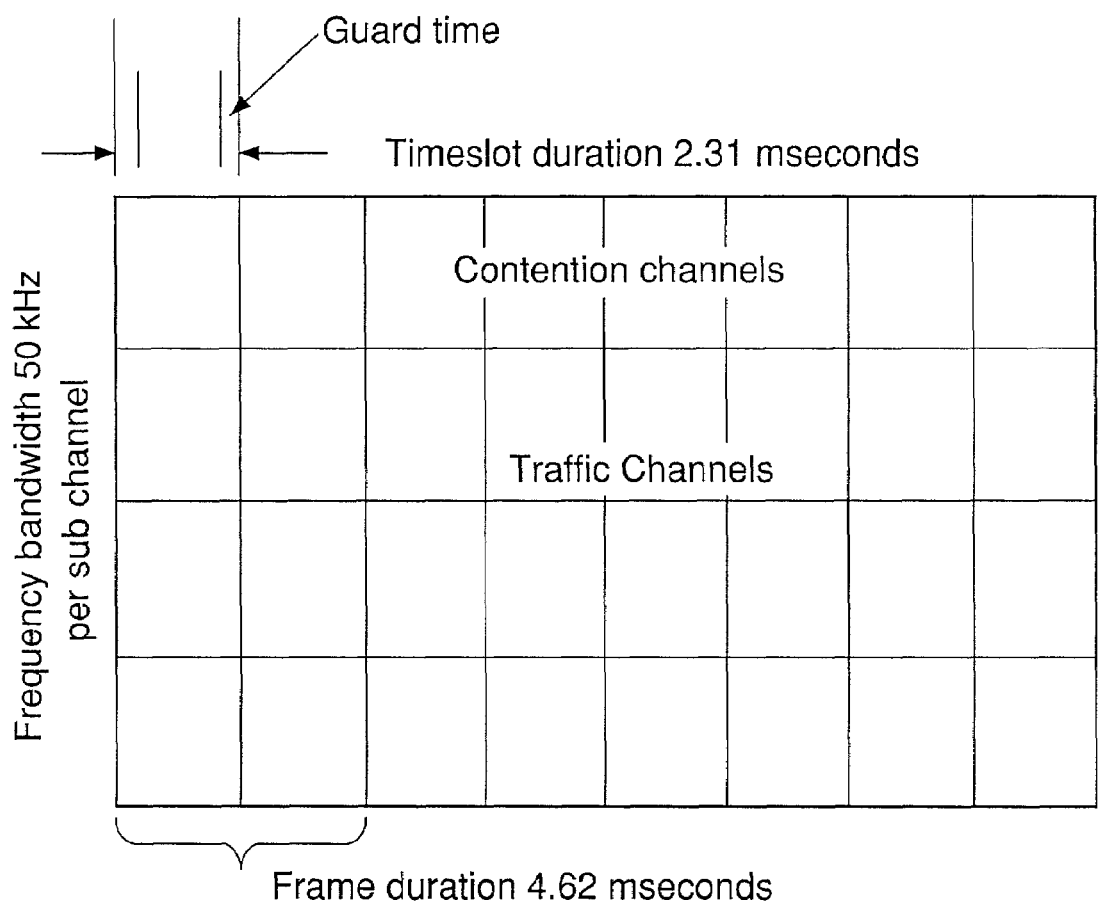
FIG. 3 illustrates the frequency-time organization plan in the return link of the AceS satellite system.

FIG. 1 is a diagram illustrating differing path delays in a satellite communication system. Satellite 100 transmits and receives electromagnetic signals to and from terminals on the earth 102. The satellite 100 preferably has antennas arranged to transmit and receive signals in spot beams, which each have a footprint 104 on the earth. Due to the curvature of the Earth 102, the distance between two terminals A and B within a particular spot beam and the satellite 100 are different. This difference is shown by Dt at 106. Because the path links from the satellite 100 to a terminal at A and from the satellite 100 to a terminal at B are different, the synchronization signals transmitted by the satellite take longer to arrive at the terminal at B. Similarly, a RACH burst transmitted by the terminal at B takes longer to propagate to the satellite 100 than a RACH burst transmitted by the terminal at A.

Figure 4:
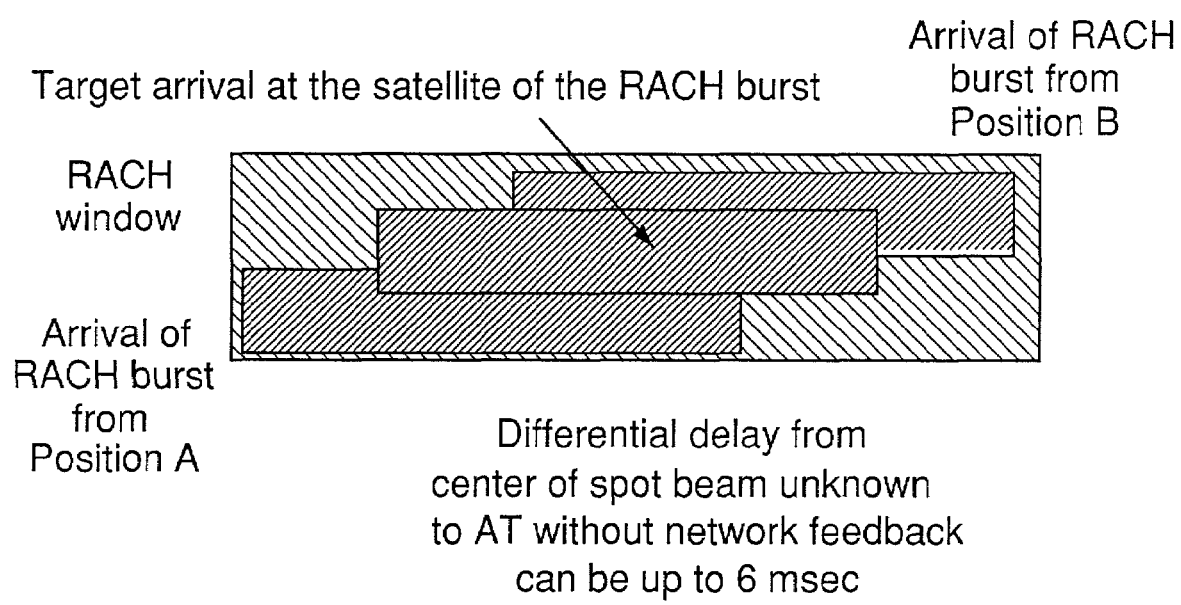
FIG. 4 illustrates the arrival of RACH bursts from different user terminals within a large contention channel window.

The timing uncertainty caused by the differing path lengths between terminals and the satellite 100 is further illustrated in FIG. 4, which shows the relative arrival times of RACH bursts transmitted from terminals at position A and position B, respectively. Thus, the satellite communication system must be able to accommodate for this timing uncertainty. The only way to account for the timing uncertainty without timing feedback from the satellite 100 is to provide a large enough window of time within the control channel to receive RACH bursts from any terminal within a particular spot beam.

In a communication system according to the present invention, broadband channels 108 are provided for broadband communication. Each channel is time divided into timeslots 110 which are preferably 5 msec in duration. An integer number of timeslots 110 form a frame 112. The number of timeslots 110 per frame 112 is preferably eight (8), so that the frame is 40 msec in duration.

Each traffic channel 110 is capable of delivering broadband data because the bandwidth of each channel is 126 kHz. As is understood in the art, a portion of the total bandwidth of the channel is reserved for control channel functions. The control channel 114 is similarly time divided into time slots, and any number of time slots may be reserved as a contention channel 116.

According to the invention, a first contention channel 114 is configured to span more than one time slot, and preferably four time slots. The first contention channel 114 is used by unsynchronized user terminals for the transmission of RACH messages to request access to the traffic channels 110. The first contention channel spans more than one time slot, and preferably four time slots, to provide for the timing uncertainty of RACH messages arriving from different user terminals having different path delays, as discussed above. If the first contention channel is configured to span four 5 msec time slots, then the total duration of the first contention channel is 20 msec.

The first contention channel is used in a conventional manner to transmit RACH messages when the user terminal is unsynchronized to the satellite. This will happen, for instance, when a user terminal is first activated, or when the user terminal has not transmitted any data or requested network access for a significant period of time. In such a case, the user terminal is able, as is understood in the art, to transmit a RACH message to the satellite based on a timing reference sent by the satellite, but without needing any timing correction information.

Once the satellite has successfully received a RACH message from a particular user terminal, the satellite is able to communicate a timing correction back to the user terminal, based on when the RACH message was received within the first contention channel window. Thus, the first contention channel is used for rough timing correction of user terminals which are unsynchronized.

Figure 5:
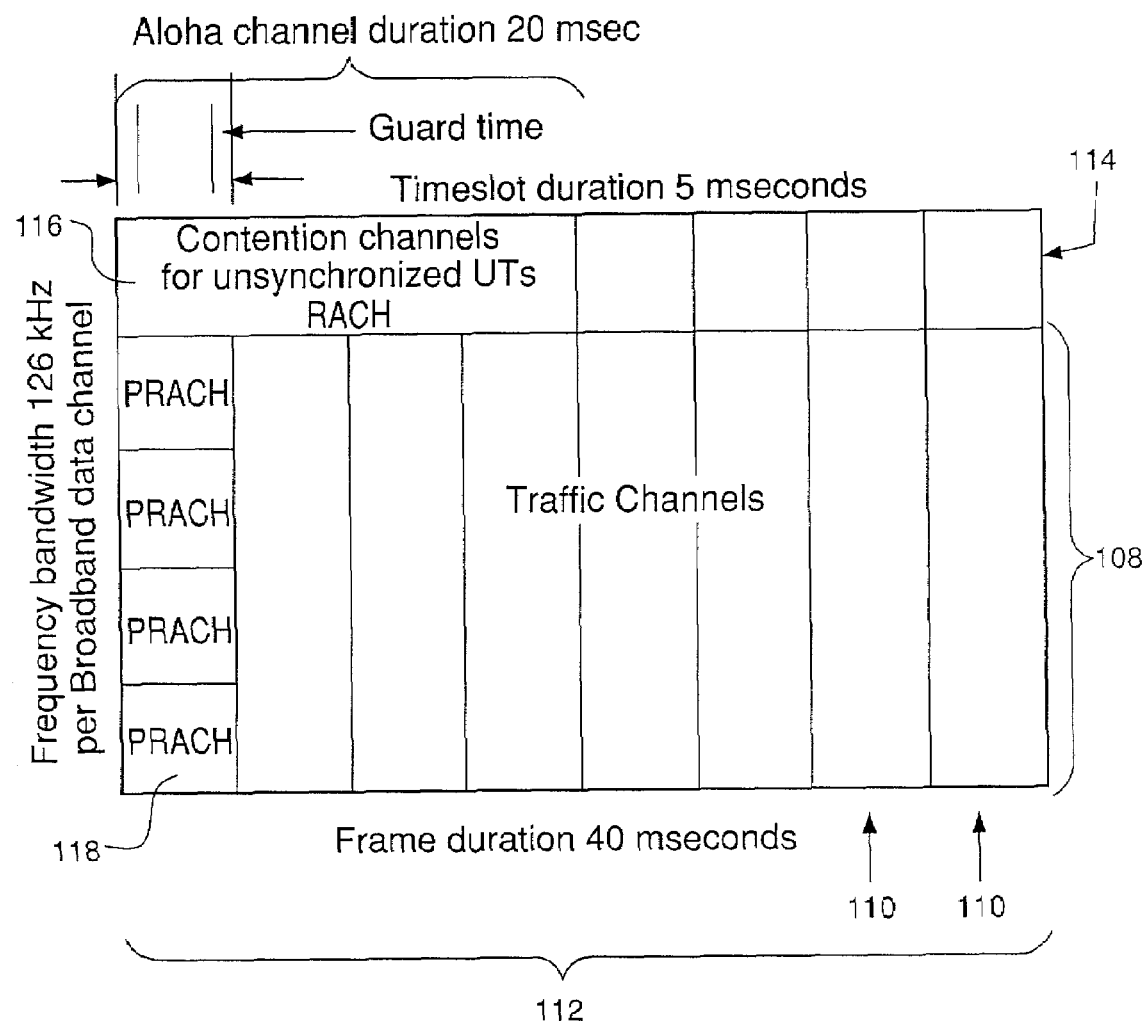
FIG. 5 illustrates two contention channel types mapped onto a frequency-time organization plan according to an embodiment of the present invention.

According to the invention, there is a second type of contention channel configured into the time-frequency map of each frame 112. The second contention channel type 118 will be referred to as a PRACH channel. The PRACH channels are narrow band channels, preferably 31.5 kHz in bandwidth, with a duration which is less than the duration of the first contention channel 116. Preferably, the duration of each PRACH channel is one time slot, or 5 msec, in duration. The PRACH channels are preferably 31.5 kHz wide so that four PRACH channels can be simultaneously transmitted within a single time slot, as is shown in FIG. 5.

PRACH channels are used to receive PRACH messages from user terminals. PRACH messages are sent by synchronized user terminals that have packet data to transmit. Because four PRACH channels 118 can be overlaid onto a single broadband traffic channel 108, the network is able to accommodate more PRACH requests. Thus, the network is able to accommodate the increased number of connection requests caused by the bursty nature of packet data traffic.

User terminals that are unsynchronized either or start up, or after a long period without transmitting, use the first contention channel 116 to request network access over a traffic channel. The increased duration of the first contention channel accomodates the timing uncertainties of the unsychronized user terminal. Once the user terminal has successfully sent a RACH to the satellite, the satellite is able to provide timing correction information (feedback) to the user terminal, after which the user terminal is able to send subsequent PRACH messages over any of the PRACH contention channels in order to request network access to transmit packet data. Thus, the RACH channel is used for coarse timing correction, when it is necessary, and the PRACH channels are used for fine timing correction. Because of the decreased duration of the PRACH channels, more PRACH channels can be accommodated within the time-frequency map, thereby accommodating the increased contention channel demand due to bursty data traffic.

It should be understood by those of skill in the art that a broad variety of configurations of the time-frequency map are contemplated to be within the scope of the present invention. For instance, it is not necessary that the PRACH channels all be within the same time slot. It may be advantageous in a given system to allow one narrowband PRACH channel to be in each of four time slots, thereby allowing a single PRACH receiver on board the satellite to "frequency hop" and service multiple PRACH channels.

Furthermore, the configuration of the time-frequency map could be dynamic, to allow for changing needs of the system. Thus, PRACH channels could be added or deleted from the time-frequency map, as needed, to accommodate increased or decreased demand on the contention channels, and to leave the maximum available capacity for traffic channels.

While the invention herein disclosed has been described by means of specific embodiments and applications thereof, numerous modifications and variations could be made thereto by those skilled in the art without departing from the scope of the invention set forth in the claims.

What is claimed is:

1. A wireless radio terminal for transmitting and receiving packets over a wireless network, comprising:
   a first access request signal generator for generating a first access request signal; and
   a second access request signal generator for generating a second access request signal; and
   wherein said first access request signal generator is adapted to transmit said first access request signal on a first channel, said first channel having a duration equal at least to the duration of said first access request signal plus a maximum timing uncertainty between unsynchronized terminals; and
   wherein said second access request signal generator is adapted to transmit said second access request signal on a second channel within a second window having a duration less than the duration of said first window; and
   wherein said second channel has a duration equal to an integer number of time slots, and said second channel is within the frequency range associated with traffic channels; and
   wherein said second channel has a bandwidth less than one half of the bandwidth of said traffic channels.

2. A wireless network having a plurality of broadband channels, a first contention channel having a duration equal at least to the duration of a RACH message plus a maximum timing uncertainty, and a second contention channel having a duration which is less than the duration of said first contention channel;
   wherein said second contention channel is within the frequency range associated with traffic channels; and
   wherein said second contention channel has a bandwidth less than one half of the bandwidth of said traffic channels.

3. A wireless network having a plurality of broadband channels, a first contention channel having a duration equal at least to the duration of a RACH message plus a maximum timing uncertainty, and a second contention channel having a duration which is less than the duration of said first contention channel;
   wherein said second contention channel is within the frequency range associated with traffic channels; and
   wherein said second contention channel has a bandwidth less than one third of the bandwidth of said traffic channels.

4. A wireless network having a plurality of broadband channels, a first contention channel having a duration equal at least to the duration of a RACH message plus a maximum timing uncertainty, and a second contention channel having a duration which is less than the duration of said first contention channel;
   wherein said second contention channel is within the frequency range associated with traffic channels; and wherein said second contention channel has a bandwidth less than one fourth of the bandwidth of said traffic channels.

5. A method of transmitting access request signals in a wireless network, said method comprising the steps of:

receiving a beacon signal from said network identifying a time frame, dividing a communication channel into a plurality of subchannels, said channel having a continuous range of frequencies, transmitting a first electromagnetic signal in a first one of said plurality of subchannels during a first of a plurality of time slots, said first electromagnetic signal having a duration less than one of said time slots, abstaining from transmitting electromagnetic signals on said first subchannel during at least a second of said plurality of time slots, receiving timing correction information from said network, based on said timing correction information, transmitting a second electromagnetic signal in a second one of said plurality of subchannels during a third of said plurality of time slots, said second electromagnetic signal having a duration less than one of said time slots, receiving traffic channel assignment data from said network, said traffic channel assignment containing data representing a particular time slot, transmitting data during said particular time slot on a traffic channel comprising a continuous set of frequencies allocated to said subchannels.

* * * * *